Sept. 18, 1923.

J. C. THOM 1,468,333

METHOD AND APPARATUS FOR SEALING CARTONS

Filed March 2, 1921    4 Sheets-Sheet 1

INVENTOR
James C. Thom
BY
Meyers, Cavanagh & Hyde
ATTORNEYS

Sept. 18, 1923.

J. C. THOM

1,468,333

METHOD AND APPARATUS FOR SEALING CARTONS

Filed March 2, 1921  4 Sheets-Sheet 2

INVENTOR
James C Thom
BY
Meyers Cavanagh & Hyde
ATTORNEYS

Sept. 18, 1923.  1,468,333
J. C. THOM
METHOD AND APPARATUS FOR SEALING CARTONS
Filed March 2, 1921   4 Sheets-Sheet 4

INVENTOR
James C Thom
BY
Meyers, Cavanagh & Hyde
ATTORNEYS

Patented Sept. 18, 1923.

1,468,333

UNITED STATES PATENT OFFICE.

JAMES C. THOM, OF CHICAGO, ILLINOIS, ASSIGNOR TO COMBINATION MACHINE COMPANY, OF NEW YORK, N. Y., A CORPORATION OF DELAWARE.

METHOD AND APPARATUS FOR SEALING CARTONS.

Application filed March 2, 1921. Serial No. 448,985.

*To all whom it may concern:*

Be it known that I, JAMES C. THOM, a citizen of the United States, and resident of Chicago, in the county of Cook and State of Illinois, have invented certain new and useful Improvements in Methods and Apparatus for Sealing Cartons, of which the following is a specification.

My invention relates to a method and mechanism suitable for sealing cartons or other package enclosures.

The invention has been devised with especial reference to the sealing of cartons having foldable flaps, usually arranged at two opposite open sides of the cartons; but in many respects the invention is adaptable to cartons or package enclosures of other forms.

As to the method, the general object is to provide process steps which can be performed by hand, but which are especially well adapted for machine operations, and which are suitable for economical high-capacity production of sealed cartons which may have the above mentioned characteristic structure, or other cartons or package enclosures to which the process steps are adaptable, as sufficiently explained hereafter.

The method, therefore, includes, in one aspect, the sealing of cartons or similar containers having flaps or other foldable parts to be sealed, by applying adhesively-conditioned sheets of material to successive cartons, and more particularly, applying to successive cartons a continuous strip of sealing material, and subsequently severing the strip between adjacent cartons. In another aspect, the invention comprises the application to cartons having inner and outer flaps or foldable members, of a piece of sealing material adhesively conditioned on both sides, between the inner and outer flaps, and as previously stated the sealing material may be in a continuous strip applied to successive cartons, and subsequently severed. In another aspect, the invention comprises the application of sealing sheets or strips of sealing material to different sides of each of a series of cartons. In another aspect the invention comprises the application of a continuous sealing strip to the linear joints or lines of intersection between folded flaps of successive flapped cartons, and subsequently severing the strip, with or without additional manipulation of the severed strip ends, as sufficiently explained hereafter.

More particularly described, but still in general terms, the method-invention adapted as hereafter disclosed to a particular type of carton, includes the application to cartons having open sides, partly covered by inturned flaps, and having other flaps ready for inturning, of pieces of sealing material adhesively coated on both sides, which first adhere to and secure the inturned flaps, and to which the other flaps are then secured; and desirably the sealing material is in continuous, strip form, and is so applied to successive packages or cartons, and then severed, to permit further separate handling of the individual cartons. The cartons are thus sufficiently sealed for some purposes; but desirably the gap or line of intersection of the last infolded flaps is covered by an outer strip of adhesively coated material, the ends of which are also desirably folded over on the carton ends and adhesively affixed; and desirably also, this outer sealing strip is applied in continuous form to successive packages and then severed. In some cases this second sealing operation may be used as an alternative for the first operation, which would then be dispensed with.

As to the mechanism, the general object is to provide simple, durable and reasonably cheap machines or devices corresponding, generally, in their functions, to the method.

The mechanism, in one complete embodiment, as here shown, comprises, briefly described, means for advancing a series of filled cartons having flaps arranged as above, means for adhesively conditioning both sides of two sealing strips, which are supplied from rolls, means for directing the strips and applying them to opposite open sides of the cartons, over the first inturned flaps of each, means for inturning and pressing down the remaining flaps, and means for then severing the sealing strips by excising superfluous parts between two adjacent cartons. The second main part of the method is then performed by means acting during further travel of the carton series to apply the outer sealing strips, adhesively conditioned on one side only, over the outer flap-joints, means for severing the strips without excision, producing projecting strip-ends, and means for then turning down these ends and securing them on end walls of the packages.

As well as having other advantages, the described method of sealing by supplying the strip of adhesively coated material affords a very economical, rapid and convenient way of supplying the necessary adhesive for sealing the flaps or similar members of cartons or similar package enclosures, and dispenses with other more complicated or undesirable devices for applying adhesive directly to parts of the carton, such as the flap.

Both the method and mechanism usually include additional operations or features as sufficiently explained hereafter. It is to be understood, however, that certain features of both method and mechanism may be used without others; also that various changes may be made within the principles disclosed; and I contemplate any performances of the method and the use of any structures, which are properly within the scope of the appended claims.

Figure 1:
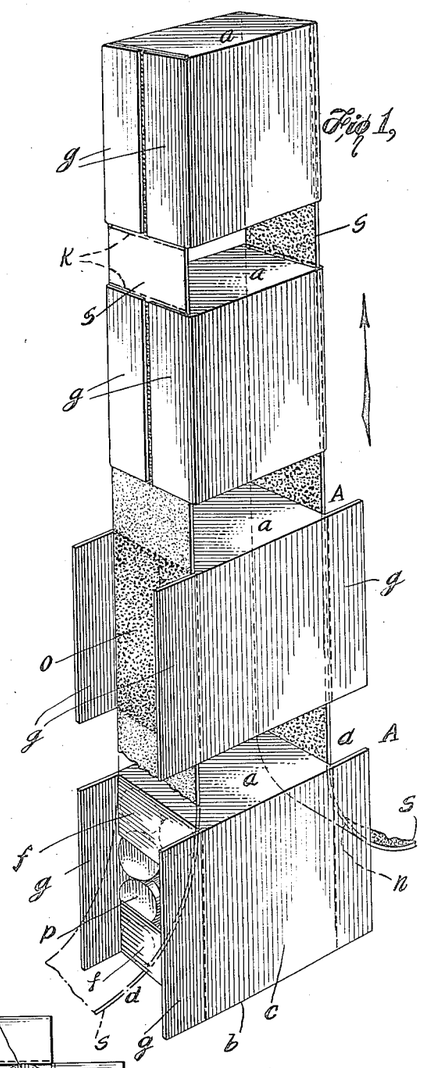
Figure 1 is a perspective view showing the first or principal part of the method, according to one performance of it.
Figure 3:
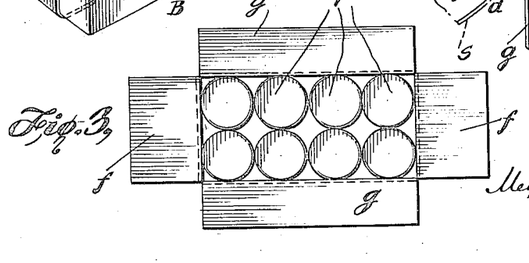
Figure 3 is a front view of a filled carton with its flaps extended, or unfolded.

A container or carton suitable for use in connection with my invention is shown in Figure 3 and in the first position of Figure 1. This carton A has a top $a$, bottom $b$, closed side walls $c$, and two other more or less open opposite sides $d$. End flaps $f$ extend from ends $a$ at the open sides of the carton, and side flaps $g$ extend from sides $c$. The carton is shown in these figures filled with suitable contents, such as cylindrical packages P, the particular nature of the contents being, however, immaterial. The end flaps $f$ have been folded in against the package contents at the open sides of the carton, and the side flaps $g$ are desirably left extending outward as shown in the first position in Figure 1. Strips of sealing paper S are then prepared, preferably by coating each strip on both sides with suitable adhesive such as glue, and these strips are applied to the open sides of a succession of the cartons and caused to adhere to the outer faces of the inturned end flaps $f$, which are thus held in closed position. The side flaps $g$ are then turned in, as shown in the third position in Figure 1, and pressed against the outer adhesive surfaces of the sealing strips. According to this particular performance of the method, several successive packages are connected by the continuous sealing strips, and at a desirable point the packages may be disconnected for further individual handling by severing the sealing strips between adjacent packages along the lines $k$; and this method of severing provides at the same time for the excision of superfluous pieces $s$ of the sealing strips between the packages.

Figure 2:
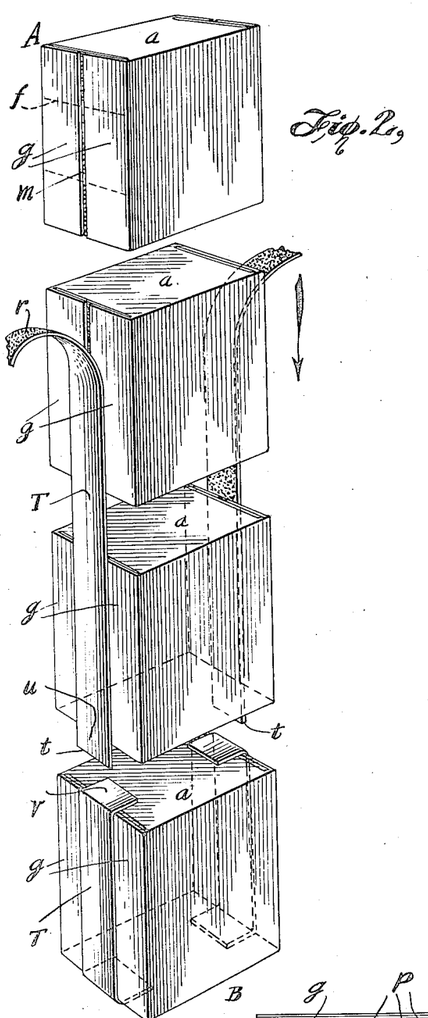
Figure 2 is a similar view of the second part of the method, or of one which may be alternatively used in some cases.

There is thus produced a succession of sealed packages, as shown in the first position in Figure 2, in which the inner and outer flaps $f$ and $g$ are firmly held in closed position by an interposed strip of adhesively secured material.

According to one performance of the method, instead of supplying continuous sealing strips, each individual package may be sealed by a shorter strip or separate sheet of sealing material, properly coated with adhesive. Any severing operation is then unnecessary.

Desirably in some cases, in the continuous strip method, less adhesive is applied to certain portions of the sealing strips than to others; for instance Figure 1 shows a normal amount of adhesive $n$ applied to the inner surface of each strip and a normal amount of adhesive $o$ applied to outer strip surfaces, coextensive with the length of the packages, and with a smaller amount of adhesive applied to outer portions of the strips which are to lie between the packages. Or in some cases the inner or outer strip surfaces which are to be intermediately positioned may be left entirely free from adhesive, and the strip portion $s$ between the last two packages in the series of Figure 1 is therefore shown entirely free of adhesive.

The packages may be utilized in some cases in the condition shown in the first position, Figure 2. In other cases, however, it is desirable to additionally seal them and especially to apply sealing material over the joints or lines of intersection $m$ at the edges of the two side flaps at opposite sides of the package. For this purpose a series of the initially sealed packages are advanced, as shown in Figure 2, and a strip of sealing material T having its inner surface *r* adhesively coated, is applied to the successive packages so as to overlie the linear joints *m*. At a suitable point the outer sealing strips are cut along the lines *t*, thus separating the individual packages, and at the same time leaving projecting strip end portions *u*, which are then turned down upon end walls *a* of the packages and secured by the adhesive previously deposited upon them, as indicated at *v*. There is thus produced a succession of completed packages B (Figure 2), each having the initial or internal seal previously described, and the final or external seal afforded by the sealing strip T with its downturned ends *v*. The packages are in other words very securely fastened, and are rendered dirt and dust-proof, and practically moisture-proof, when the package materials are suitably conditioned to resist passage of moisture.

In some cases the second general division of the method illustrated in Figure 2 may be used as a substitute for the first division of the method illustrated in Figure 1, that is to say, the initial or inner sealing of the flaps may be omitted, and they may be simply provided with outer seals after the fashion of Figure 2.

Figures 4 to 13 illustrate, in a somewhat diagrammatic way, suitable apparatus for performing the method. The mechanism in this particular embodiment comprises a horizontal conveyor 20 and a vertical conveyor 21. Conveyor 20 is in the form of a belt running over pulleys 22 and 23 carried by shafts 24 and 25 respectively. The upper stretch of the belt is supported by a table 26. The table is supported by legs 27, and the conveyor shafts are supported in bearings carried by frame members 28. The conveyor 20 may be driven in any suitable way. In the present instance an electric motor 30 is located below the table, and this is belted to a counter shaft 31, and pulleys and a belt or chain 33 connect the counter shaft to conveyor shaft 24.

The vertical conveyor desirably consists of two parallel chains 35 running over pairs of sprockets 36 and 37, sprockets 36 being mounted on shaft 25 and sprockets 37 being mounted on an upper shaft 38. The package carriers in the form of plates 40 are connected at intervals to opposite links or blocks of the two chains. The carton supporting plates are thus spaced apart, so that they straddle the horizontal conveyor and engage the lower ends of the cartons near the open sides thereof. The vertical conveyor is driven by a chain or belt 42 leading from the counter shaft 31 to shaft 25. To provide for different speeds of the two conveyors, when that is desirable, pulley 23 of conveyor 20 may turn freely on shaft 25, while sprockets 36 may be fixed to it.

Filled cartons A substantially in the condition shown in the first position in Figure 1, that is with the end flaps *f* turned in towards the package contents and the side flaps *g* extending more or less outwardly, are placed end up, that is resting on the ends *b*, on the upper stretch of conveyor 20, and are thus advanced toward the rising stretch of conveyor 21. Each carton finds its way between two of the pairs of ascending carriers 40, and is lifted by one of the pairs of carriers; and the next carton on the belt 20 is urged against the ends of the ascending carrier pair, until an open space arrives into which it enters, and so on. The ascending cartons may be guided in position by a rail 44, having an outwardly curved lower end 45.

As the cartons proceed vertically, the sealing strips S are to be applied in the general manner described in connection with the method. These strips are provided in the form of rolls 48 carried by shafts 49, one roll being located at each side of the machine adjacent to the ascending leg of conveyor 21. The strips S may in some cases be originally glued on both sides, and in that case are prepared for package application by moistening the glued surfaces. More desirably, however, the sealing strips are of plain unglued paper, and are rendered adhesive by applying liquid glue to them. For this purpose a glue tank 50 is located at each side of the machine. This may rest on a heating tank 51 to which hot water may be supplied to properly condition the glue. A roll 54 carried by shaft 55 is submerged in glue in tank 50, and the strip S is led from its roll 48 around roll 54 and then upward to the point of application. As it leaves the glue tank, the strip may be guided by suitable devices such as rolls 56 and 58 referred to hereafter.

Figures 5, 6, 7, 8, 9, 10:
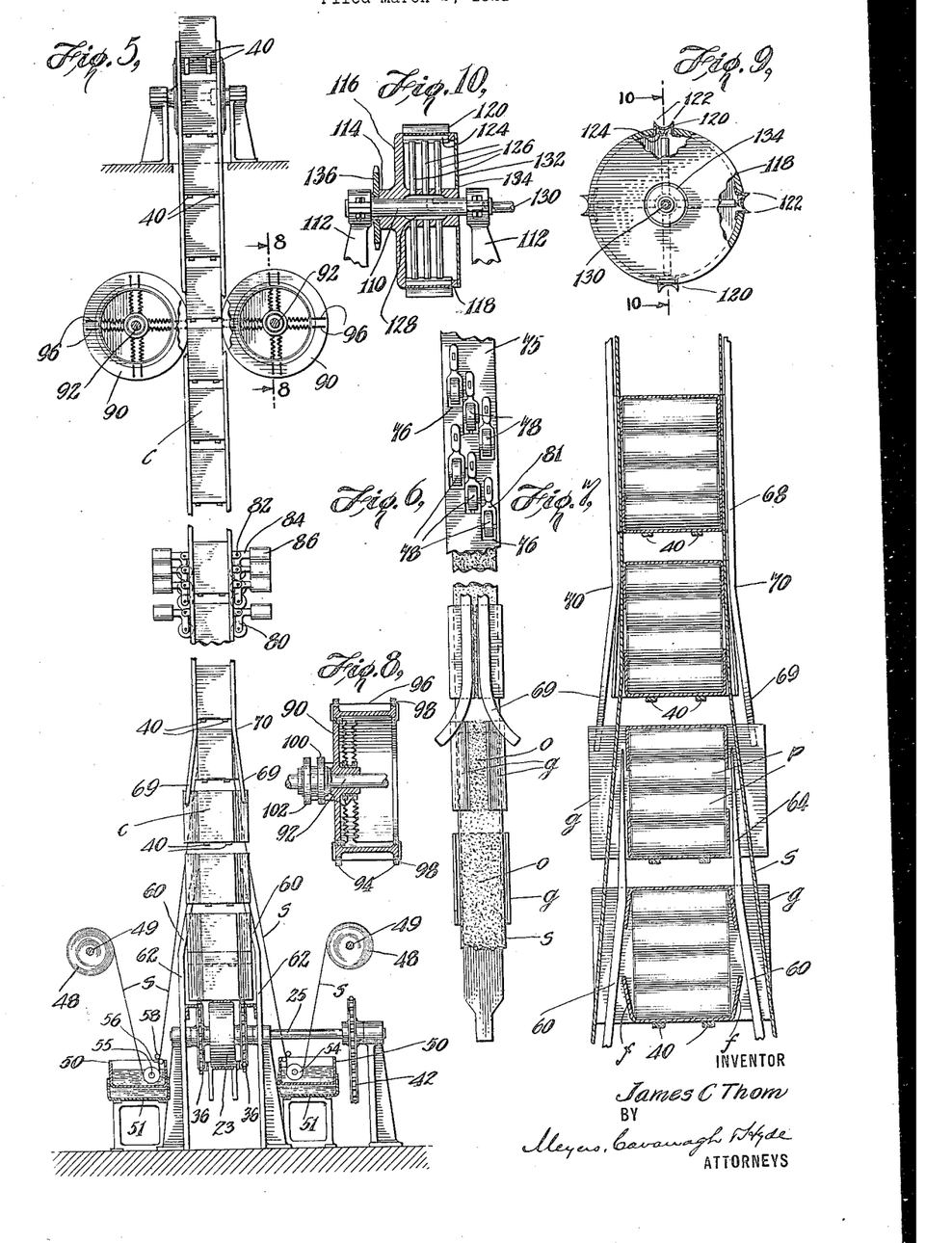
Figure 5 is a section at 5—5, Figure 4.
Figure 6 is a right-side elevation, enlarged, of part of Figure 5.
Figure 7 is an enlarged detail of part of Figure 5.
Figure 8 is a sectional detail, at 8—8, Figure 5.
Figure 9 is a side elevation of a modified strip severing and excising device.
Figure 10 is a section at 10—10, Figure 9.
Figure 11:
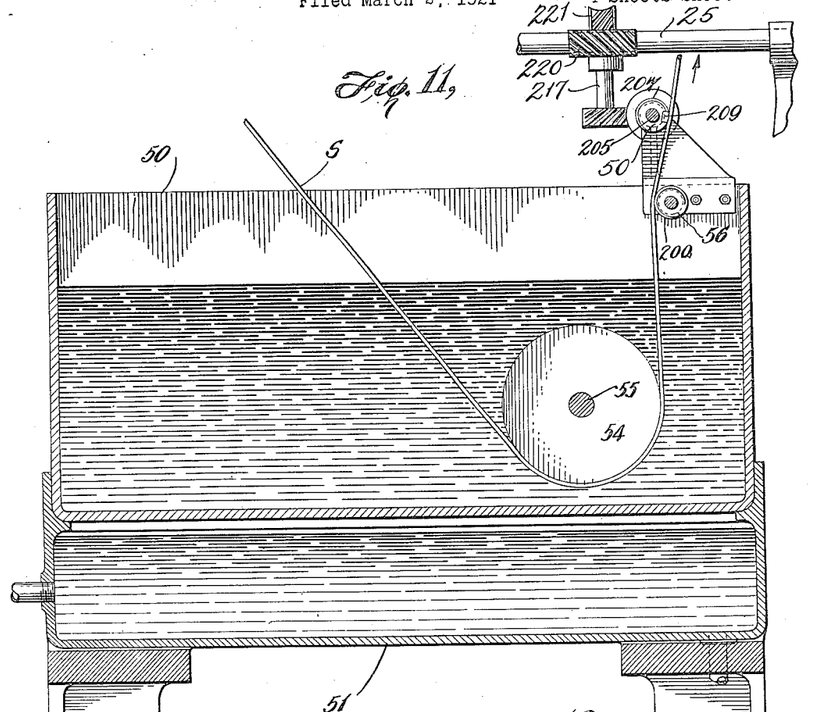
Figure 11 is a vertical section of a strip-gluing device.

As the cartons commence to move upward, they pass between convergent guide members 60 (Figures 5 and 7). The lower vertical portions 62 of these guide members are spaced apart sufficiently to permit the carton with its extending flaps *g* to pass between them. As the carton rises, one of the flaps *g* extends at each side of the diagonal guide members 60. Above the diagonal portions the guides are straightened out to provide members 64 close to and parallel to the line of package movement. These members wipe down and position properly the package end flaps *f*. The sealing strips S are directed convergently toward the series of cartons outside the guides 60, which prevent premature contact of the strips with the cartons. At a point above the upper ends of the guide portions 64, the inner adhesive surfaces of the sealing strips are engaged with the outer surfaces of end flaps *f* of one of the packages, and the ascending movement of the package series draws the strips along for application to each successive package. Adjacent to the point of initial contact of the sealing strips with the packages, the package series is engaged by vertical guide strips 68, the lower ends of which are curved divergently, as indicated at 69, and which are also bent outward angularly, as at 70, Figure 7. The divergently curved portions of the guide strips engage flaps *g* and turn them progressively inward. The diagonal portions of the guides then bring these flaps into contact with the outer adhesive surfaces of the sealing strips and the vertical portions 68 of the guide strips located very close to the package surfaces press the side flaps firmly in position and retain them so until the adhesive sets, the vertical flight of the conveyor being made sufficiently long, with reference to the speed at which it moves, to secure the necessary hardening or setting of the adhesive.

At a suitable point in their vertical travel, the packages are desirably acted upon by suitable pressing devices to additionally insure the proper adhesion of the sealing strips to the respective flaps. For this purpose guide plates 75 may be located above the upper ends of the vertical guide strips just mentioned. These plates are provided with apertures 76 arranged in diagonal series, and a pressing roll 78 is arranged to pass through each aperture and bear against a package surface. The rolls are carried by clevis arms 80 of bell cranks 81, each of which is fulcrumed at 82 in a lug secured to plate 75. Each bell crank has an outwardly extending arm 84 provided with a weight 86. Each roll desirably has only a small width in relation to the width of the package, and the independent action of the multiplicity of rolls, in connection with their diagonal or staggered arrangement, causes the package surfaces, irrespective of such irregularities in thickness as naturally occur, to be firmly pressed and secured in the desired manner.

Figures 4, 14:
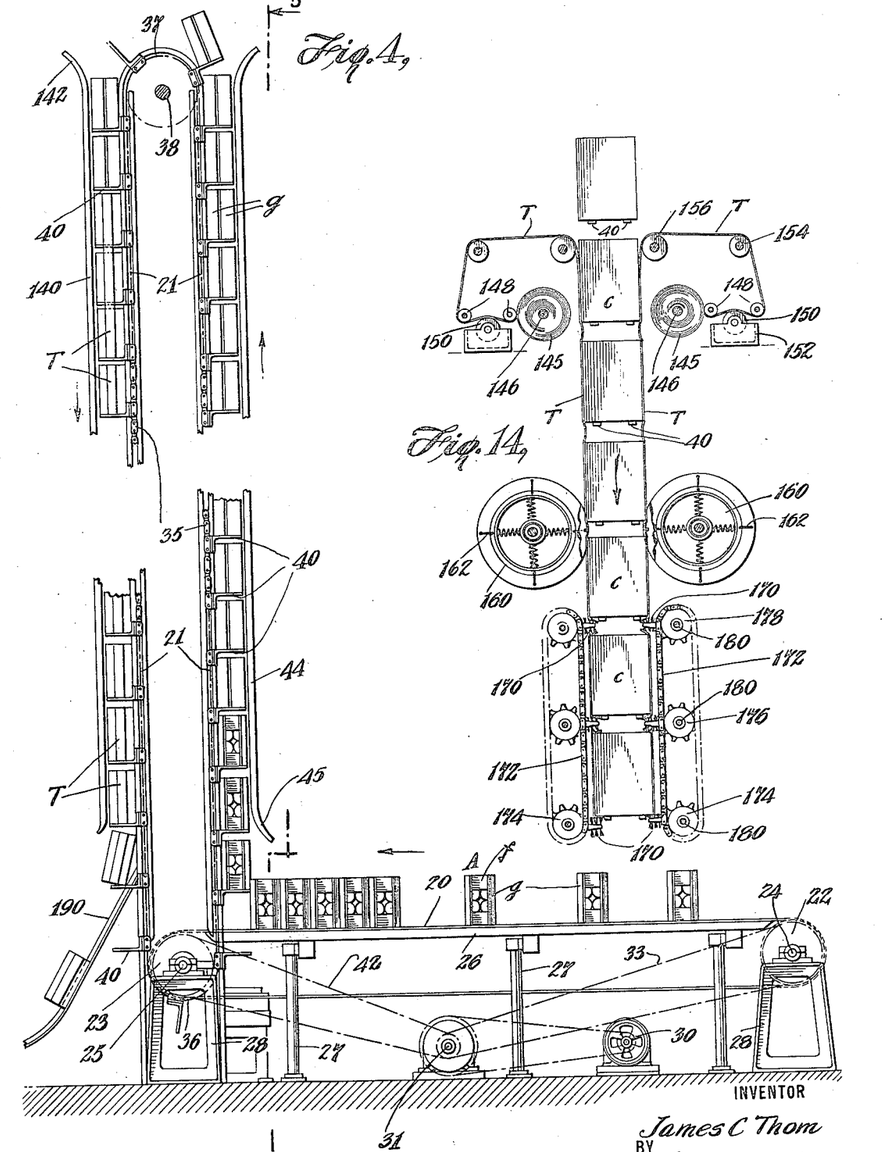
Figure 4 is a side elevation, partly diagrammatic, of a machine embodying the invention in one form, some parts being omitted for the sake of clearness.
Figure 14 is an enlarged view of the descending leg of the vertical conveyer, and related devices.

At a suitable point above the pressing devices, means are provided for severing the sealing strips comprising in the present instance severing wheels 90 (Figures 5 and 8), mounted on shafts 92, one at each side of the ascending conveyor leg. The shafts 92 are driven in any suitable way, not particularly shown, so that the severing devices move at the same speed as the adjacent packages. Each wheel is provided with peripheral flanges 94, and these are spaced apart somewhat more than the width of the cartons, so that the flanges will straddle the cartons. At equally spaced intervals about the wheel peripheries, severing devices 96 are located; and desirably these severing devices are in the form of hot wires spanning the space between flanges 94, and desirably also these wires are arranged in pairs, so that at each action they will not only sever the sealing strip, but will excise a portion of it as previously described in connection with the method. The two active stretches 96 of each severing wire therefore pass through insulating plugs 98 in flanges 94. The ends of these wires are brought down at each side of the wheel and are then brought inward through other insulating plugs, and one end of each wire is connected to a contact ring 100 on the wheel hub, and the other end of the wire is connected to a contact ring 102, the wires and rings being of course suitably insulated. There are in the present case four pairs of wires all connected to the contact rings, so that by applying brushes suitably connected in an electric circuit to the respective rings, current is supplied to the wires to maintain them at red heat or such a desired temperature as may be suitable for severing the sealing strips along the lines *k*, Figure 1, close to the ends of the packages, as the severing wheels are rotated in conformity with package movement. The distance between packages is considerably exaggerated in Figures 1 and 2 for the sake of clear perspective illustration. As shown in Figures 4, 5 and 14, the distance between packages in practical operation is very small, and therefore the amount of strip material that is wasted by excision between the packages is inconsiderable. While electrically heated severing devices are desirable in many instances, the severing devices may be otherwise heated. For instance as shown in Figures 9 and 10, the severing devices may comprise irrevoluble shafts 110 secured in bracket arms 112. Hubs 114 of the severing wheels 116 are mounted revolubly on these shafts. The cylindrical wheel periphery 118 is apertured at intervals to receive severing elements 120, each of which is of relatively thin metal capable of being readily heated, and also of such composition that it is suitably durable in the presence of heat. These thin metal members are each formed with two severing ridges 122, and an inner frame pocket 124 is formed between the adjacent side walls of the inner surface of each of the members. Within the cylindrical wheel body the hub 114 is apertured to receive a series of burner pipes 126, each series corresponding to one of the severing elements and having the outer ends of its pipes arranged close to the frame pocket 124 on one of the elements. The inner ends of these pipes communicate with a chamber 128 between the hub and the shaft, and gas or an air and gas mixture is supplied to this chamber through pipes 130. Any suitable burner arrangements may be made to provide for proper combustion at the ends of the burner tubes. The open side of the wheel is partially closed by a plate 132, an aperture 134 being left between the plate and the hub for egress of products of combustion. The wheel may be driven in any suitable way, for instance by sprocket 136 and a chain connected to any suitable driving member moving at the proper speed.

When the packages reach the upper end of the vertical conveyor, they pass above shaft 38 and are reversed in position, and again rest on supporting plates 40, and are guided in their downward movement by guide plate 140 having an outwardly curved upper end 142. In the downward movement, the packages are to receive the outer sealing strips T when it is considered desirable to apply the additional sealing strips.

Adjacent to each side of the descending package column a strip T is provided in the form of a roll 145 mounted on a shaft 146. This strip is conducted by guide rolls 148 over a gluing or moistening roll 150 which dips in a liquid tank 152. The strip T may either be originally glued on one side, and in that case the tank 152 contains water to render the strip adhesive by moistening its glued surface; or the strip may be of plain paper, and in that case tank 152 contains glue, and roll 150 applies the glue to the proper surface of the strip. The strip then goes over other guide rolls 154 and 156, and the last named roll may also serve to press the strip adhesively to the packages over the line of intersection $m$ of the inner edges of side flaps $g$, as previously explained. The packages proceed to a suitable point, where the strips T are severed, and desirably the severing may be accomplished substantially in the manner previously described, that is, either by electrically heated wire devices or by hot serving elements otherwise heated, except that at each severing action only a single severance of the strip is necessary, since no part of the strip is to be excised, in accordance with the preferred method of operation. Therefore a severing wheel 160 is located at each side of the descending package column, and each of these wheels has at suitable intervals a single hot wire 162, and the wheels are rotated at proper speed in relation to package travel so that each hot wire severs one of the strips T along the line $t$ (Figure 2). The projecting ends $u$ of the severing strips are then inturned against the ends of the packages by suitable means, such as in the present instance brushes 170 carried by chains 172 moving over driving and guide sprockets 174, 176 and 178 carried by shafts 180. As each set of brushes passes over sprockets 178 it enters between two adjacent packages and turns in the strip ends $u$; and in the further movement of the packages the brushes retain this position and press the strip ends in place, until finally the brushes are withdrawn as they pass about sprockets 174. Other suitable means may be provided as may be desirable for inturning and securing the strip ends. The packages may now be discharged from the descending leg of the conveyor in any suitable way, for instance by diagonal supporting and guide rails 190 arranged to straddle supports 40. The guide rails 190 divert the packages from the conveyor and carry them by gravity to a suitable point for further handling.

As explained in connection with the process, it is desirable in some cases to provide for application of reduced amounts of adhesive to certain parts of the sealing strip surfaces, and it is also desirable to provide means for regulating and equalizing the application of adhesive to other portions of the strip surfaces. The strip engaging and guiding devices 56 and 58 are desirably adapted for these purposes. The device 56 (Figures 11 to 13 inclusive) may be fixed against rotation, and may be in the form of a bar provided with a multiplicity of annular ridges 200; and these may be conveniently formed by screw threading the bar. In that case the ridges have an angular arrangement due to the lead of the threads. As the strip passes over this bar, excess glue is scraped from one side of it, and at the same time the glue is distributed evenly over the surface of the strip owing to the capillary action of the closely spaced ridges and their diagonal arrangement. The other regulating devices 58 may be mounted on a rotatable shaft 205. The major part of the surface of these devices is provided with ridges 207 substantially after the fashion of the device 56; but desirably this device is provided with a longitudinal slot, and a glue regulating or scraping element 209 is inserted in this slot. This element has its part-cylindrical periphery extending outward a distance at least equal to the radius of the ridges 207. Shaft 205 is driven by any suitable connections at a speed slower than the movement of the sealing strip, so that the strip slides on the surface of the member 58; and when the scraping bar 209 engages with the strip, it remains in scraping engagement with it for a certain length of time, sufficient to remove a considerable part of the glue from strip portions $p$ (Figure 1), that is to say, portions of the outer surface of the strip which are intermediate the packages when the strip is applied. Other means may be provided for properly regulating and distributing the glue application.

Figures 12, 13:
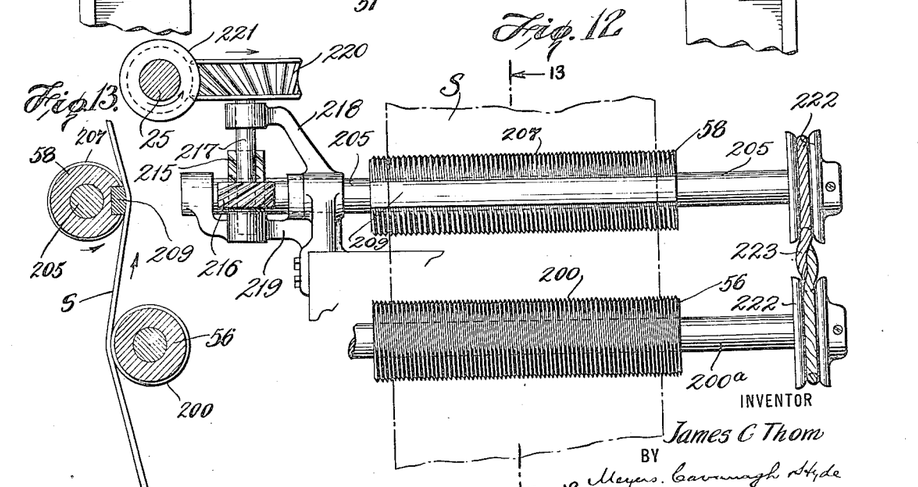
Figure 12 is an enlarged detail of the same.
Figure 13 is a section at 13—13, Figure 12.

One way of driving the rolls 58 is shown in Fig. 12. The shaft 205 carrying the glue regulating roll is extended and provided with a worm wheel 215 and this is engaged by a worm 216 carried on a vertical shaft 217. The shaft is supported in bearings in bracket arms 218 and 219. At the upper end of shaft 217 is a worm wheel 220 engaging a worm 221 on lower conveyor shaft 25, previously mentioned. The gears are designed and arranged so that the regulating roll 207 is driven in the proper direction and at the proper speed in relation to movement of the sealing strip S, as sufficiently explained above. The regulating devices 200 may in some cases be rotatable, and in that case their shafts 200$^a$ are mounted in bearings, and these shafts may be connected to the adjacent shafts of the rolls 207 by suitable means, such as pulleys 222 and a crossed belt 223, which may be of the helically coiled wire type, to provide proper driving tension; or any other convenient driving connection may be provided between the adjacent roll shafts. When the rolls 200 are positively driven at the proper speed they may also be provided with scraper bars similar to the scraper bars 209 provided for regulating rolls 207, and in that case the inner, as well as the outer sides of the strips S will have the amount of glue applied to portions which are to be intermediate the packages, reduced, substantially as explained in connection with the regulating devices 207.

I claim:

1. A method of sealing cartons having folded flaps, comprising advancing a series of cartons in spaced relation, applying a continuous sealing strip adhesively to successive cartons over the flaps, and severing the strip between adjacent cartons.

2. A method of sealing cartons having folded flaps, comprising advancing a series of cartons in spaced relation, applying a continuous sealing strip adhesively to successive cartons over the flaps, and excising portions of the strip between adjacent cartons.

3. A method of sealing cartons having inner and outer flaps, comprising applying a sheet of sealing material adhesively coated on both sides between the inner and outer flaps.

4. A method of sealing cartons having inner and outer flaps, comprising applying a continuous sealing strip adhesively between the inner and outer flaps.

5. A method of sealing cartons having inner and outer flaps, comprising applying a continuous sealing strip adhesively between the inner and outer flaps, and severing the strip between adjacent cartons.

6. A method of sealing cartons having inner and outer flaps, comprising applying a continuous sealing strip adhesively between the inner and outer flaps, and excising a superfluous portion of the sealing strip between adjacent cartons.

7. A method of sealing cartons having inturned flaps at one side, comprising advancing a series of cartons in spaced relation, adhesively conditioning a surface of a sealig strip, and applying a continuous portion of the strip to successive cartons over their flaps and severing the strip between adjacent cartons.

8. A method of sealing cartons having inner and outer flaps at one side, comprising adhesively conditioning both sides of a continuous sealing strip, and applying the strip to successive cartons over the inner flaps and under the outer flaps thereof.

9. A method of sealing cartons having inner and outer flaps at one side, comprising adhesively conditioning both sides of a continuous sealing strip, applying the strip to successive cartons over the inner flaps and under the outer flaps thereof, and severing the strip between adjacent cartons.

10. A method of sealing cartons having inner and outer flaps at one side, comprising adhesively conditioning both sides of a continuous sealing strip, applying the strip to successive cartons over the inner flaps and under the outer flaps thereof, and separating adjacent cartons by removing exposed portions of the sealing strip.

11. A method of sealing cartons having inturned end flaps and foldable side flaps, comprising advancing a continuous strip of sealing paper in proximity to a series of the cartons, applying adhesive to both surfaces of the strip with the amount of adhesive applied to one of the surfaces reduced at intervals corresponding to package intervals, applying one surface of the strip to the end flaps of successive cartons, and folding down the side flaps of the cartons upon the other side of the strip.

12. A method of sealing cartons having inturned end flaps and foldable side flaps, comprising advancing a continuous strip of sealing paper in proximity to a series of the cartons, applying adhesive to both surfaces of the strip with the amount of adhesive applied to one of the surfaces reduced at intervals corresponding to package intervals, applying one surface of the strip to the end flaps of successive cartons, folding down the side flaps of the cartons upon the other side of the strip, and severing the sealing strip between adjacent cartons.

13. A method of sealing cartons having inturned end flaps and foldable side flaps, comprising advancing a continuous strip of sealing paper in proximity to a series of the cartons, applying adhesive to both surfaces of the strip with the amount of adhesive applied to one of the surfaces reduced at intervals corresponding to package intervals applying one surface of the strip to the end flaps of successive cartons, folding down the side flaps of the cartons upon the other side of the strip, and cutting out portions of the sealing strip between adjacent cartons.

14. A method of sealing cartons having infolded flaps with adjacent margins, comprising applying an adhesively coated continuous sealing strip to successive cartons over said flap margins, severing the strip between adjacent cartons to produce projecting strip end portions, and folding down said projecting portions upon ends of the cartons.

15. A method of sealing cartons having folded inner flaps and outer flaps, comprising applying a continuous sealing strip to successive cartons between the inner and outer flaps, folding down the outer flaps, and applying a continuous sealing strip to successive cartons over the outer flaps.

16. A method of sealing cartons having inner and outer flaps, comprising applying a continuous sealing strip to successive cartons between the inner and outer flaps, applying a continuous sealing strip to successive cartons over the outer flaps, and severing the strips between adjacent cartons.

17. A method of sealing cartons having foldable inner and outer flaps at one side, comprising applying a continuous sealing strip adhesively coated on both sides to a succession of cartons over the inner flaps, turning the outer flaps down upon the outer surface of the strip, severing the strip between cartons, and applying an adhesively coated continuous outer sealing strip to successive cartons over the outer flaps and severing the outer strip between cartons.

18. A method of sealing cartons having foldable inner and outer flaps at one side, comprising applying a continuous sealing strip adhesively coated on both sides to a succession of cartons over the inner flaps, turning the outer flaps down upon the outer surface of the strip, severing the strip between cartons, applying an adhesively coated continuous outer sealing strip to successive cartons over the outer flaps and severing the outer strip between cartons, producing projecting end portions of the outer strip, and turning down and adhesively affixing said projecting portions to ends of the cartons.

19. Carton sealing mechanism, comprising a conveyor and means thereon for moving a series of cartons in definitely spaced relation, means for adhesively conditioning and applying a sealing strip to each of two sides of the carton series, and means for severing the strips between cartons.

20. Mechanism for sealing cartons having inturned inner flaps and foldable outer flaps, comprising a conveyor for a series of cartons, means for supplying an adhesive sealing strip to the series of cartons over the inner flaps, and means for turning down the outer flaps upon the adhesive strip.

21. Mechanism for sealing cartons having inturned inner flaps and foldable outer flaps, comprising a conveyor for a series of cartons, means for supplying an adhesive sealing strip to the series of cartons over the inner flaps, means for turning down the outer flaps upon the adhesive strip, and means for severing the strip between adjacent cartons.

22. Mechanism for sealing cartons having inturned inner flaps and foldable outer flaps, comprising a conveyor having spaced supports for a series of cartons, means for adhesively conditioning continuous sealing strips and applying one of the strips to each side of the carton series, and means for severing the strips between adjacent cartons.

23. Mechanism for sealing cartons having inturned inner flaps and foldable outer flaps, comprising a conveyor for a series of separated cartons, means for adhesively conditioning both sides of a continuous sealing strip and applying one surface of the strip to successive cartons over the inner flaps, means for folding down the outer flaps and securing them to the outer adhesive surface of the strip, means for serving the strip between cartons, means for adhesively conditioning one surface of a continuous outer sealing strip, means for applying the strip to successive cartons over the outer flaps, and means for serving the outer strip between cartons.

24. Mechanism for sealing cartons having inturned inner flaps and foldable outer flaps, comprising a conveyor for a series of cartons, means for adhesively conditioning both sides of a continuous sealing strip and applying one surface of the strip to successive cartons over the inner flaps, means for folding down the outer flaps and securing them to the outer adhesive surface of the strip, means for serving the strip between cartons, means for adhesively conditioning one surface of a continuous outer sealing strip, means for applying the strip to successive cartons over the outer flaps, means for severing the outer strip between cartons, and means for turning down projecting ends of the outer strip against ends of the cartons.

25. Mechanism for sealing cartons having inturned inner flaps and foldable outer flaps, comprising means for conveying a series of cartons horizontally, means for taking the cartons from the horizontal conveyor and moving them vertically in spaced relation, means for applying a continuous sealing strip to the cartons, and means for severing the strip.

26. Mechanism for sealing cartons having inturned inner flaps and foldable outer flaps, comprising means for conveying a series of cartons horizontally, means for taking the cartons from the horizontal conveyor and moving them vertically in spaced relation, means for applying a continuous sealing strip to the cartons, means for severing the strip, means for conveying the cartons farther in spaced relation, means for applying an additional sealing strip to successive cartons, and means for severing the strip.

27. Mechanism for sealing cartons having inturned inner flaps and foldable outer flaps, comprising a horizontal conveyor, a vertical conveyor for a spaced series of cartons, means for appying a continuous adhesive sealing strip to successive cartons during vertical movement, means for severing the strip, means for conveying the cartons downward in spaced relation, means for applying another continuous adhesive sealing strip during downward movement, and means for severing the latter strip.

28. Mechanism for sealing cartons having inturned inner flaps and foldable outer flaps, comprising means for applying a continuous adhesive sealing strip to each side of successive cartons, heated severing elements, and means for applying said heated elements to the strips to sever them between cartons.

29. Mechanism for sealing cartons having inturned inner flaps and foldable outer flaps, comprising means for conveying a spaced series of cartons, means for applying a continuous sealing strip adhesively to each side of the carton series, and rotary severing devices each having a plurality of spaced pairs of heated severing elements, and means for rotating the severing devices in relation to the carton series so that each pair of heated elements removes a portion of a sealing strip between adjacent packages.

30. In package sealing mechanism, the combination with means for conveying a series of packages and means for applying a continuous sealing strip to successive packages, of a rotary severing device, spaced severing elements thereon, and means for heating the elements.

31. In package sealing mechanism, the combination with means for conveying a series of packages and means for applying a continuous sealing strip to successive packages, of a rotary severing device, spaced severing elements thereon, and means for electrically heating the elements.

32. Mechanism for sealing cartons having inner and outer flaps, comprising means for conveying a series of the cartons, a guide member for pressing down the inner flaps, means for supplying an adhesive sealing strip exteriorly of the guide member, and an additional guiding device for turning down the outer flaps and pressing them against the strip.

33. Mechanism for sealing cartons having inner and outer flaps, comprising means for conveying a series of the cartons, means for applying a sealing strip, and a plurality of independently acting narrow pressing devices each arranged to act on a different lateral portion of the carton as it is advanced by the conveying means.

34. Mechanism for sealing cartons having inner and outer flaps, comprising means for conveying a series of the cartons, means for applying a sealing strip, and a plurality of independently acting weighted narrow pressing devices each arranged to act on a different lateral portion of the carton as it is advanced by the conveying means.

35. Mechanism for sealing cartons having inner and outer flaps, comprising means for advancing and sealing a series of the cartons, and a plurality of independent narrow pressing rollers acting on different lateral portions of successive cartons.

36. Mechanism for sealing cartons having inner and outer flaps, comprising means for advancing and sealing a series of the cartons, and a plurality of independent narrow weighted pressing rollers acting on different lateral portions of successive cartons.

37. In carton sealing mechanism, means for advancing a series of cartons, means for applying a continuous sealing strip to successive cartons, and means for applying adhesive to the strip, comprising a tank containing adhesive, and means for guiding the strip through the tank.

38. In carton sealing mechanism, means for advancing a series of cartons, means for applying a continuous sealing strip to successive cartons, means for applying adhesive to the strip, comprising a tank containing adhesive and means for guiding the strip through the tank, and means for distributing adhesive on the strip as it leaves the tank.

39. In carton sealing mechanism, means for advancing a series of cartons, means for applying a continuous sealing strip to successive cartons, means for applying adhesive to the strip, comprising a tank containing adhesive and means for guiding the strip through the tank, and means for reducing the amount of adhesive supplied to certain portions of the strip.

40. In mechanism for sealing cartons having inner and outer flaps, means for conveying a series of cartons, means for pressing down the inner flaps, means for supplying an adhesively coated sealing strip over the inner flaps, and guiding devices for turning in and pressing down the outer flaps upon the sealing strip.

41. Mechanism for sealing cartons having foldable flaps, comprising means for advancing a spaced series of the cartons, means for adhesively applying a continuous sealing strip to successive cartons to secure their flaps, and means for severing the strip between cartons.

42. Mechanism for sealing cartons having foldable flaps at two different sides, comprising means for advancing a spaced series of the cartons, means for adhesively securing continuous sealing strips over successive cartons on each of said sides to secure the flaps, and means for severing the strips between adjacent cartons.

43. Mechanism for sealing cartons having foldable flaps, comprising means for advancing a spaced series of the cartons, means for applying a continuous sealing strip adhesively to successive cartons to seal their flaps, and means for severing the strip between cartons.

44. Mechanism for sealing cartons having foldable flaps at two different sides, comprising means for advancing a spaced series of the cartons, means for applying two continuous sealing strips adhesively to successive cartons one over each of the sides of said cartons to seal the flaps, and means for severing the strips between adjacent cartons.

45. A method of sealing cartons having foldable flaps at different sides, comprising advancing a series of separated and definitely spaced cartons, applying a continuous sealing strip adhesively to each of the sides of a series of the cartons to secure the flaps, and severing the strips between adjacent cartons.

46. A method of sealing cartons having foldable flaps at each of two opposite sides, comprising advancing a series of separated and definitely spaced cartons, applying adhesively a continuous sealing strip to each of said opposite sides of a series of the cartons, and severing the strips between adjacent cartons.

Signed at Chicago, in the county of Cook and State of Illinois, this 23rd day of Feb., A. D. 1921.

JAMES C. THOM.